United States Patent [19]

Sasaki

[11] Patent Number: 4,768,051
[45] Date of Patent: Aug. 30, 1988

[54] ELECTRIC DRIVING DEVICE

[75] Inventor: Saburo Sasaki, Tokyo, Japan

[73] Assignee: Ricoh Company, Ltd., Tokyo, Japan

[21] Appl. No.: 35,513

[22] Filed: Apr. 7, 1987

[30] Foreign Application Priority Data

| Apr. 7, 1986 | [JP] | Japan | 61-50921[U] |
| Apr. 19, 1986 | [JP] | Japan | 61-90950 |
| Apr. 30, 1986 | [JP] | Japan | 61-100388 |
| Apr. 30, 1986 | [JP] | Japan | 61-100389 |

[51] Int. Cl.[4] .......... G03B 3/10; G03B 15/05; G03B 9/08
[52] U.S. Cl. .............. 354/400; 354/149.11; 354/234.1
[58] Field of Search ............ 354/400, 402, 403, 404, 354/405, 419, 145.1, 149.11, 234.1, 195.1, 187

[56] References Cited

U.S. PATENT DOCUMENTS

| 4,426,145 | 1/1984 | Hashimoto | 354/195.1 |
| 4,504,132 | 3/1985 | Martin et al. | 354/234.1 |
| 4,634,254 | 1/1987 | Ogihara et al. | 354/234.1 |
| 4,653,892 | 3/1987 | Namai et al. | 354/400 |
| 4,671,639 | 6/1987 | Kodaira et al. | 354/400 |
| 4,684,233 | 8/1987 | Kodaira et al. | 354/400 |
| 4,696,559 | 9/1987 | Kondo | 354/195.1 X |

Primary Examiner—W. B. Perkey
Attorney, Agent, or Firm—Oblon, Fisher, Spivak, McClelland & Maier

[57] ABSTRACT

A lens driving device for driving a lens for use in adjusting a focus according to a distance therefrom to an object by a pulse motor, comprising; a lens driving section for driving the lens by the pulse motor, a distance measuring section for measuring the distance to the object and generating a distance information for focusing, and a generator for generating a pulse signal for driving the pulse motor, setting a pulse width of the pulse signal to a broad width at starting the pulse motor, changing the pulse width to a narrow width after starting, temporarily interrupting the generation of the pulse signal just before the lens reaches a predetermined stop position determined on the basis of the distance information for focusing generated by the distance measuring section and changing the pulse width to a broad width till the lens reaches the predetermined stop position.

3 Claims, 15 Drawing Sheets

PERIOD OF LENS TRAVELLING | PERIOD OF SHUTTER BRADE OPERATION

ELECTRIC DRIVING DEVICE

BACKGROUND OF THE INVENTION

1. Field of the Invention

This invention concerns an electric driving device and, specifically, it relates to an electric driving device for a camera in which various actuation members for photographing operations are driven by a motor.

2. Discussion of the Background

Focusing a lens on an object can be conducted by manual operation of a range ring of the lens in still cameras, cinecameras, TV cameras and the likes. By the way, the number of cameras having automatic focusing mechanisms is increasing in recent years. It is necessary for the focusing mechanism of this kind that the range ring of the lens is driven by a motor based on the information obtained from the means for detection of the state of the focusing.

A pulse motor having features capable of accurately and simply controlling the rotational angle has generally been used as a motor for driving the lens. On the other hand, the pulse motor also has a feature that the starting torque is smaller compared with other DC motors. In such a pulse motor, a battery is used as a power source by way of a constant voltage circuit or constant current circuit for reliably conducting the rotation, and particularly, starting. Further, the value of output voltage and output current is set to have such a sufficient margin that a reliable rotating operation can be conducted irrespective of voltage drop of the battery or fluctuations of the load torque.

Further, the pulse width of generated pulse signals is set constant with a sufficient margin based on various conditions.

The first problem in such a conventional lens driving device is that since the period of current supply to the pulse motor is set to have a sufficient margin for securing the starting torque, that is, it is set so as to drive the motor at a low speed, a considerable time is required for driving the lens to a predetermined position, as well as there is a loss of a current after the starting and it lowers the utilization efficiency of valuable battery power source. On the other hand, there is another problem that if the pulse width of the driving pulse is narrowed to obtain a high speed driving from beginning, the accuracy in the stopping position will be lowered and the starting torque will be insufficient as described above.

Further, in a conventional electric driving device for a camera, there is a case in which a plurality of actuation members conducting directly or indirectly the photographing operation is driven by one motor, for example, a motor for use on film winding. In this case, a shutter charging (so-called shutter setting) and a charging for driving the focus ring of a lens having an automatic focusing function, for example, from the focused position in the last photographing operation to the nearest or infinite (∞) side are conducted simultaneously or sequentially with the rotation of a motor during winding up a film.

And in this case, for popping up a strobo device previously stored by manual operation into a stored position (stowed position) by a half-depression stroke of a shutter release button, it is necessary to supply a magnet with a current based on light information measured by an automatic exposure control circuit (hereinafter simply referred to as : AE control circuit).

Then, current is supplied to a magnet for maintaining the charge of the shutter charged at last film winding to maintain the shutter at a stand-by state.

Then, current is supplied to a magnet for releasing lock of a focus ring charged at the last film winding and current is supplied to a locking magnet for locking the focus ring when a predetermined focusing is obtained.

When the shutter release button is further depressed deeper, current is supplied to a shutter-opening magnet to open the shutter. Then, current is supplied to a magnet for shutter-closing operation based on the light information measured by the AE control circuit to complete the film exposure, thereby completing a series of photographing sequence.

However, as the second problem of a conventional electric driving device for a camera, since a plurality of actuation members are charged by the driving force of a film winding motor and they are locked at the charged state by magnets, it requires a magnet for locking the shutter charge, a magnet for locking the focus ring, a magnet for releasing the locking of strobo locked at a stowed position and displacing it to the operating position etc., and accordingly, the cost is increased, the electrical power consumption is also increased and the battery life is reduced, particularly, in those cameras where the battery voltage is restricted at about several volts and a small capacity.

Furthermore, it also requires a circuit for conducting the control of the current supply to the magnets and results in a problem in those cameras for which reduction in the size is highly required.

Further, since it requires a mechanical governor for slowly displacing the lens and a mechanical governor for controlling the shutter time, as well as switches for detecting the lens position, the cost is increased.

Further, since it requires setting mechanisms for the respective actuation members as described above, it brings about an additional problem that the structure becomes complicated also in this respect.

Furthermore, there is another case in the conventional electric driving device for ordinary cameras in which a lens driving mechanism for moving a lens to a focused position and a mechanism for a shutter opening and closing according to predetermined time based on the measured intensity of light, are incorporated as separate mechanisms and they are actuated individually. It has been tried to conduct the lens driving and shutter opening and closing operation by a common motor instead of such conventional cameras.

However, the mechanism for the lens driving and shutter opening and closing by a common motor tried so far uses a magnet for stopping the lens at a focused position as described above. Accordingly, it requires a magnet and a driving circuit therefor in addition to the motor, which leads to a third problem.

Further, in the conventional cameras, a lens driving mechanism for moving the lens to focused position and a shutter mechanism for opening and closing the shutter for a predetermined time in accordance with the measured intensity of light, are incorporated as separate mechanisms and they are operated individually. In place of such a conventional camera, it has been attempted to conduct the lens driving and shutter opening and closing operations by a pulse motor.

In a mechanism for lens driving and shutter opening and closing by a pulse motor considered so far, the pulse motor is driven at a constant pulse rate and the rotational force of the pulse motor is used for lens driving and shutter opening and closing operations by way of a speed reduction mechanism. However, since the load at starting lens is greater than the load at shutter opening and closing operation, there is the fourth problem, that is, the torque of the pulse motor and the speed reduction ratio of the speed reduction mechanism have to be adjusted for lens driving operation requiring large load and, as a result, the size of the pulse motor is enlarged and the speed is lowered as a whole due to the increase in the speed reduction ratio.

SUMMARY OF THE INVENTION

A first purpose of this invention is to provide a lens driving device capable of driving the lens by a pulse motor smoothly and at a high speed, improving the accuracy for the stop position and improving the utilization efficiency of a battery power source.

A second purpose of this invention is to provide an electric driving device for a camera capable of conducting each of the operations of displacing the strobo between a stowed position and an operating position, of driving a lens between an initial position and a focused position and of opening and closing a shutter by the rotation of one motor, without magnets for maintaining the charged state of actuation members and governor mechanisms for damping the operation, thereby simplifying the structure compared with the conventional devices of this kind, decreasing the cost, and also extremely simplifying the circuit structure of the control means for driving the actuation members.

A third purpose of this invention is to provide a lens driving and shutter opening and closing mechanism for a camera capable of eliminating the use of magnets and driving circuits therefor, conducting the lens driving and shutter opening and closing operations by one motor, and simplifying the structure.

A fourth purpose of this invention is to provide a lens driving and shutter opening and closing mechanism for a camera in which the lens driving and shutter opening and closing operations can be conducted by a pulse motor, capable of reducing the size of the pulse motor and enhancing the operation speed as a whole.

The first purpose of this invention can be attained by a lens driving device for driving a lens for focusing on an object by a pulse motor, wherein the device comprises a lens driving section for driving the lens by the pulse motor, a distance measuring section for measuring the distance to the object and generating a focus information, and means for generating a pulse signal for driving the pulse motor, setting the width of the pulse signal broad at starting the pulse motor, changing the pulse width to be narrow after starting, temporarily interrupting the generation of the pulse signal just before the lens reaches a predetermined stop position based on the focus information generated by the distance measuring section and then changing the pulse width to be broad till the lens reaches the predetermined stop position.

The foregoing second purpose of this invention can be attained by an electric driving device for a camera in which various actuation members for photographing operation are driven by a motor, wherein the driving device comprises a driving plate rotationally driven by a motor capable of forward/backward rotation and having a plurality of driving elements (driving means) comprising a cam, a pin and the like at the outer surface thereof, a strobo actuation member driven by the driving section when the driving plate is rotated by a predetermined amount from an initial position in a first direction for protruding a strobo member from a stowed position to an operating position, a lens actuation member driven by the driving means when the driving plate is rotated by a predetermined amount from the initial position in a second direction opposite to the first direction for displacing a lens to a focused position, a shutter actuation member driven by the driving means when the driving plate is rotated from the initial position in the first direction and then rotated in the first direction to the initial position thereby causing opening and closing operation of a shutter, and control means for controlling the rotational direction and the amount of rotation of the motor so that the driving plate is rotated in the first direction and in the second direction relative to the initial position.

The foregoing third purpose of this invention can be attained by a lens driving and shutter opening and closing mechanism comprising a motor for rotating a driving member forwardly by an angle in accordance with a distance to an object then backwardly by a predetermined angle and, thereafter, rotating forwardly the driving member again to a predetermined position and then backwardly to an original position, a shutter blade opened and then closed by the forward and backward rotations of the driving member near the predetermined position, a lens driving member for positioning the lens in the direction of the optical axis in accordance with the amount of rotation, and a hook lever as a lever for engaging and disengaging the driving member and the lens driving member capable of coupling the driving member with the lens driving member to rotate the lens driving member with the rotation of the driving member and breaking the coupling of the driving member with the lens driving member by the backward rotation of the driving member.

The foregoing fourth purpose of this invention can be attained by a lens driving and shutter opening and closing mechanism for a camera in which lens driving and shutter opening and closing operations are conducted by a pulse motor by way of a speed-reduction mechanism without changing the speed reduction ratio of the speed-reduction mechanism, wherin the pulse rate of pulse motor at shutter opening and closing operation is made greater than that at lens driving operation.

The first advantageous effect of this invention is that the width of pulse signal is set broad at starting of the pulse motor, while the pulse width is changed to be narrow after starting, generation of the pulse signal is temporarily interrupted just before the lens reaches a predetermined stop position, that is, an aimed position determined by focus information and, thereafter, the pulse width is changed to be broad till the lens reaches the predetermined stop position, so that it is possible to provide a lens driving device in which the lens travelling operation can be conducted smoothly at a high speed, the accuracy of stop position can be improved and, in addition, the driving torque of the pulse motor is designed reasonably as has been described above, so that the utilizing efficiency of the battery can also be improved.

As the second advantageous effect of this invention, it is possible to attain an electric driving device for a camera in which one motor can conduct various operations such as movement of a strobo from a stowed position to an operating position, movement of a lens to the focused position and shutter opening and closing operation, and no magnet for energizing and holding actuation members as described above or no governor mechanisms for damping the operations of the actuation members are required, thereby simplifying the circuit structure, and also simplifying the construction compared with conventional devices of this kind and greatly economizing the electrical power consumption of the circuit.

As the third advantageous effect of this invention, a lens driving and shutter opening and closing mechanism simpler in the structure and the circuit can be provided since the lens driving and shutter opening and closing operations can be conducted by a pulse motor and, in addition, there is no requirement for providing magnets or the likes for stopping the lens at a focused position.

The fourth advantageous effect of this invention is that since the pulse rate of pulse motor at lens driving operation is made lower than that at shutter opening and closing operation, a greater driving torque required for the lens driving operation can be obtained and, in addition, since the pulse rate of the pulse motor at shutter opening and closing operation is made higher than that at lens driving, a high speed operation necessary for the shutter operation can be realized and, as a result, size of the pulse motor can be reduced and the operation speed can be increased as a whole irrespective of the use of only one motor and a speed-reduction mechanism with a constant speed-reduction ratio.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
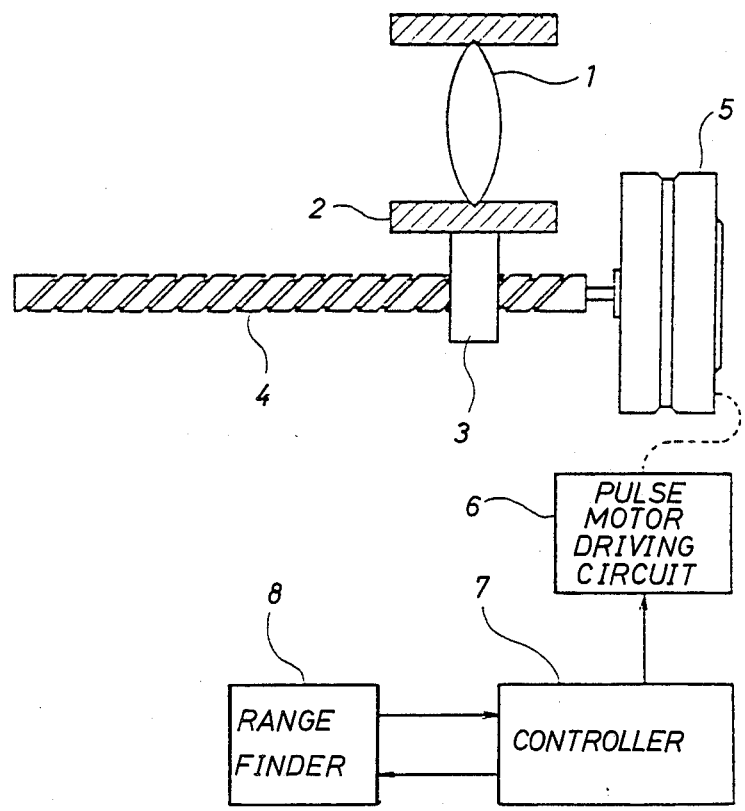
FIG. 1 is a schematic structural view illustrating a lens driving device of the first embodiment according to this invention.

In FIG. 1, a lens 1 for adjusting the focus according to the distance to an object is fixed to a mirror frame 2 and the mirror frame 2 is secured to a follower 3 with female threads. The follower 3 is coupled with a lead screw 4, which is connected to the power shaft of a pulse motor 5. The follower 3 is supported by guide means (not illustrated) so as to be capable of parallel travelling, so that it can be moved rightward and leftward in FIG. 1 by the rotation of the pulse motor 5.

A pulse motor driving circuit 6 comprises a controller required for the excitation of the pulse motor 5, a pulse power amplifier, etc. A range finder 8 is disposed for measuring the distance to an object. A controller 7 comprises a general purpose microcomputer and an interface circuit for providing pulse signals with predetermined pulse width to a pulse motor driving circuit 6 based on the focus information from the range finder 8.

Figure 2:
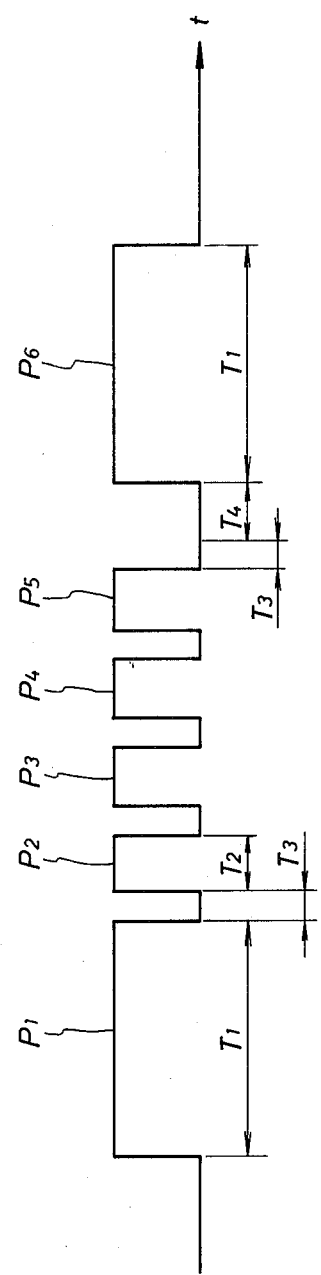
FIG. 2 is a time chart for the explanation of the operation of the lens driving device shown in FIG. 1.
Figure 3:
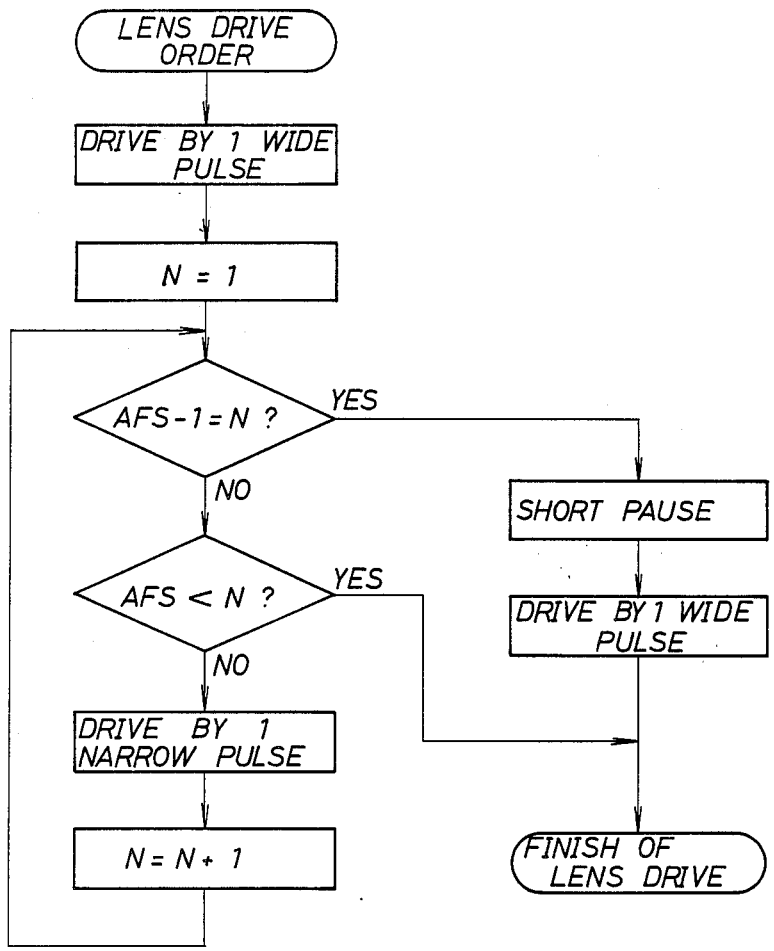
FIG. 3 is a flow chart for the explanation of the operation of the lens driving device shown in FIG. 1.

The operation of the lens driving device constituted in this way according to this invention is explained referring to the timing chart shown in FIG. 2 and the flow chart shown in FIG. 3.

In FIG. 2, T1 is maximum pulse width, T2 is minimum pulse width, T3 is pulse interval required for the property of the pulse motor 5 and T4 is short pause for the inertia control. The figure illustrates the operation in the case where AF step =6. Here, AF step represents the value proportional to a stroke of a lens when dividing the full stroke (from closest to infinite) by M which is a number of steps. A focusing can be completed by displacing the lens 1 to one of the section. When AFS=0, it shows that the lens 1 situates nearest to the film (to the right in FIG. 1), on the other hand, when AFS=M, it shows that the lens 1 situates nearest to the object (to the left in FIG. 1).

Now at the intial stage, the lens 1 is stowed at right side position nearest to the film by the follower 3 secured with the mirror frame 2. When a camera release (not illustrated) is depressed, the controller 7 is actuated and instructs the range finder 8 to measure the distance to an object. The range finder 8 generates infrared rays, measures the distance by the reflection of light and responses the focus data as an AFS value to the controller 7. The controller 7 receives the AFS value and stores it into a memory. Then, when the controller 7 gives a first pulse $P_1$ with the maximum width $T_1$ to the pulse motor driving circuit 6, the pulse motor 5 is started to rotate smoothly with a large starting torque and rotated by a predetermined angle, by which the follower 3 coupled with the lead screw 4 secured to a prime power shaft is displaced leftwardly by 1 AFS and, as a result, the lens 1 is also displaced toward the object, that is, leftwardly by 1 AFS. The controller 7 memorizes that the lens 1 is advanced leftwardly by one step in the figure setting the lens step variable N as N=1. After starting the pulse motor 5, the controller 7 switches the pulse width to the minimum width $T_2$ and outputs second pulse signal $P_2$, $P_3$, $P_4$, and fifth pulse signal $P_5$ each having the minimum width $T_2$, till the value of AFS-1 become equal to the latest N value, that is, till the lens 1 reaches a position one step before AFS determined based on the distance information detected by the range finder 8, (refer to FIG. 2). In this routine, the lens step variable N is added by one on every increase of 1 AFS and stored again.

As has been described above, the pulse motor 5 is started surely and smoothly by pulse $P_1$ with a broad width without generation of remained deviation of the rotational angle or unnecessary mechanical vibrations upon starting of the pulse motor 5, and the motor 5 is driven at a high speed by pulses $P_2$–$P_5$ with narrow width after the starting. Accordingly the time required for the movement of the lens 1 can be shortened and the current required for displacement for the identical distance can be economized, since the current supply time can be shortened and pulse width is narrow.

After outputting the fifth pulse $P_5$, since AFS-1=N, the controller 7 branches the pulse motor driving operation into pause routine and, as shown in FIG. 2, interrupts the output of the pulses for the period of $T_4$ to stop the pulse motor 5. On the other hand, a lens system comprising the lens 1, the mirror frame 2, the follower 3 and the like actuated so far at a high speed by the pulse motor 5 stops at a position one step before an AFS corresponding to the predetermined stop position, that is, at a position slightly beyond the fourth AFS due to the inertia. After the elapse of the pause period $T_4$, the controller 7 again switches the pulse width to the maximum width $T_1$ and drives the pulse motor 5 at a low speed by a sixth pulse $P_6$ having the maximum width $T_1$ to advance the lens 1 by the final 1 AFS thereby enabling to stop the lens at an aimed AFS position, that is, a predetermined stop position exactly. That is, since the last pulse $P_6$ generates strong starting torque and retentive force of the pulse motor 5, if the sixth pulse $P_6$ is outputted without the pause period $T_4$, the inertial movement of the lens system having been operated so far at a high speed is abruptly hindered to cause unnecessary generation of mechanical vibrations. In view of the above, the inertial movement of the lens system is attenuated or reduced to zero during the pause period $T_4$ and, thereafter, the pulse motor 5 is supplied with the pulse $P_6$ to generate strong retentive force, by which it can be stopped smoothly and exactly at an aimed AFS position. Further, since the current is not used for attenuating the inertia movement in the pause period $T_4$, the battery power can be economized as well.

The judging routine "AFS<N?" in the flow chart of FIG. 3 is used for the case where the lens step variable N is increased to be greater than the aimed value and it means a failure or that abnormality occurred.

This invention is not limited to the above-described embodiments but it can be embodied in various modifications within the scope not departing from the gist of the invention.

For instance, the entire AFS may generally be classified into three blocks "small", "medium" and "large" according to the whole stroke of the lens 1. In case of "small", that is, the stroke of the lens 1 is small, the pulse motor 5 may be driven by the pulse $P_1$ with a width almost equal to the maximum width $T_1$ throughout the entire stroke of the lens driving and the driving recess period $T_4$ may be reduced to zero. In the above case, it is possible to avoid the supply of complicated pulses within a short period of time to the pulse motor 5 and severe switching characteristics of the pulse motor 5 and the pulse motor driving circuit 6. On the other hand, in case of "large", that is, the stroke of the lens 1 is large, for example, from the nearest photo-taking position to the infinite photo-taking position, a smooth and rapid control is enabled by continuously varying the pulse width from the maximum width $T_1$ to the minimum width $T_2$ during the transient period from the starting to the high speed operation. The fine control described above can be realized with ease by merely storing a plurality of kinds of control patterns corresponding to "small", "medium" and "large" previously to the memory of a microcomputer in the controller 7 and can be applied to lens systems with various focal distance.

Explanation will be made of the second embodiment of this invention referring to FIGS. 4 through 12.

In FIGS. 4 through 7, a barrier 102 is so disposed in front of a camera main body 101 that it can be opened and closed rightward and leftward relative to the front of a lens for preventing obstacles such as dusts from depositing on the surface of the lens causing degradation or damage to the optical performance thereof. Further, a barrier opening button 103 is disposed on the upper surface of the camera main body 101 and the button 103 is so disposed to interlock with a barrier opening switch 104 disposed within the camera main body 101. A release button 106 is disposed on the upper surface of the camera main body 101, and a release switch 107 composed of contacts 107a, 107b and 107c is connected to the release button 106. The release switch 107 is so adapted that the contact 107a is in electrical contact with the contact 107b when the release button 106 is depressed by one-half stroke, and the contact 107b in electrical contact with the contact 107a is also brought into electrical contact with the contact 107c keeping the contact with contact 107b when the release button 106 is further depressed.

A strobo flash portion 105 adapted to pop-up on phototaking operation is disposed at the upper right corner in front of the camera main body 101.

Figure 6:
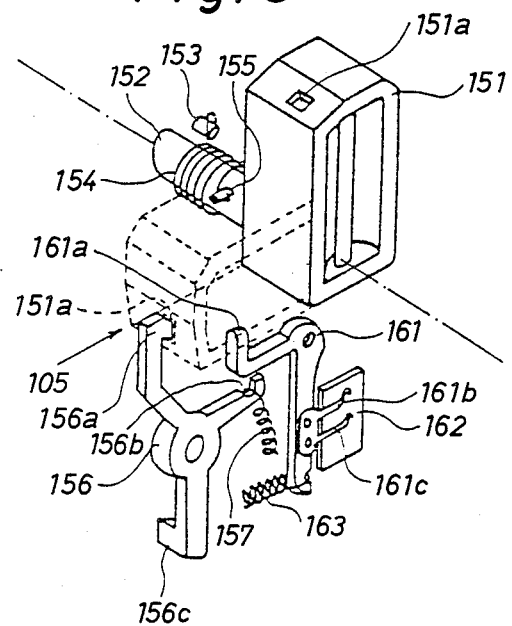
FIG. 6 is a perspective view illustrating the structure of a major part of the second embodiment according to this invention.
Figure 7:
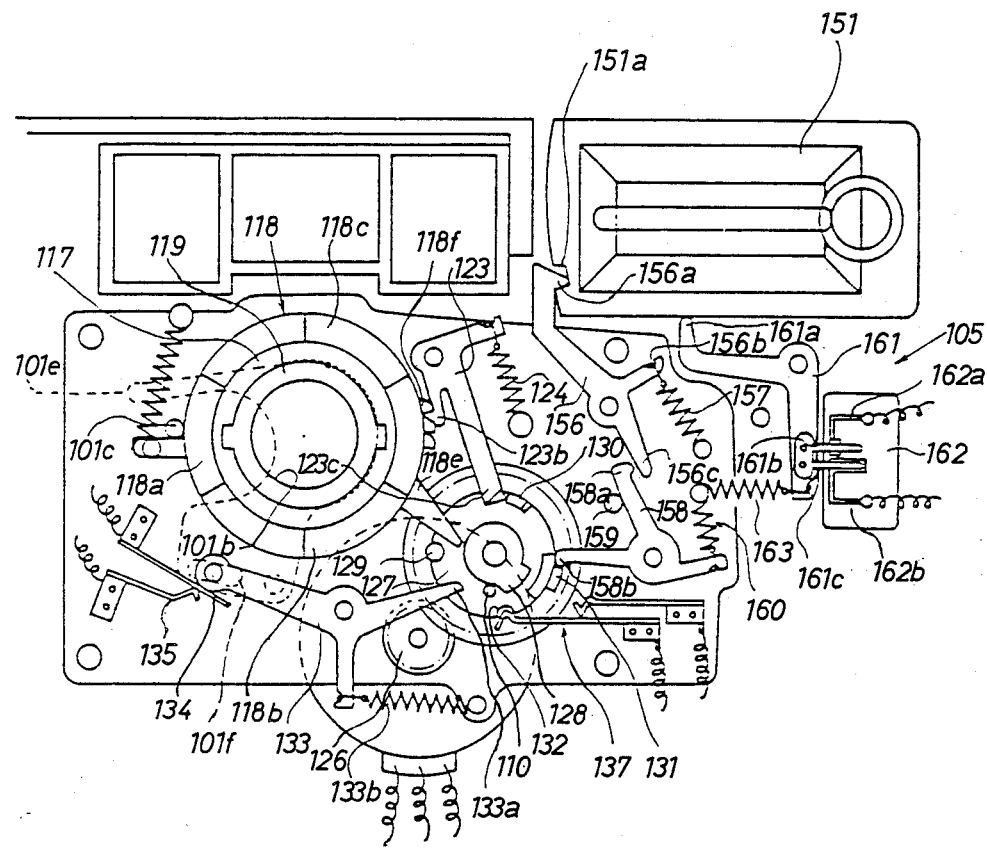
FIG. 7 is a front view illustrating the structure of the second embodiment.

As specifically shown by the perspective view of FIG. 6, a shaft 152 extended to the rear face of a flash main body 151 substantially of a rectangular configuration containing a strobo discharge tube and a reflection member is rotatably supported by an adequate means at the camera main body 101. A support pin 155 is disposed at a portion of a circumferential surface of the shaft 152. One end of a coil spring 154 is connected to the support pin 155 while the other end thereof is connected to a spring hook 153 planted on the camera main body 101. The flash main body 151 is resiliently energized in the clockwise direction around the shaft 152. A lock recess 151a is formed at the shorter side of the flash main body 151. The lock recess 151a is adapted to be locked by a locking piece 156a formed at the top end of a first arm of a strobo lock lever 156, which is rotatably supported to the immovable member of the camera and has three arms. A tension spring 157 is connected to the second arm of the strobo lock lever 156 and the rotational resilient force in the clockwise direction is applied to the strobo lock lever 156. Further, the strobo lock lever 156 is provided at the top end of the third arm thereof with an abutting portion 156c for abutting against the engaging portion 158a at the top end of the first arm of a strobo release lever 158 described later.

On the other hand, a charge control lever 161 is rotatably disposed at an immovable member of the camera for detecting the position of the flash main body 151, an abutting piece 161a for abutting against the lower surface of the flash main body 151 is disposed at the top end of the first arm of the charge control lever 161, and a tension spring 163 connected at one end to an immovable member is hooked at the other end thereof to the top end of the second arm of the charge control lever 161 to thereby provide the charge control lever 161 with a rotational resilient force in the clockwise direction. Further, brushes 161b and 161c are attached at the top end of the second arm of the charge control lever 161 and adapted such that a first electrode 162a and a second electrode 162b disposed at a base plate 162 for giving a strobo charge instruction are selectively short-circuitted with the top ends of the brushes 161b and 161c (refer to FIG. 7). When the flash main body 151 is in the stowed position the charge control lever 161 is rotated counter-clockwise by the lower surface of the flash main body 151 against the tensile force of the tension spring 163 to thereby disconnect the contact between the brush 161b and the first electrode 162a.

While, when the flash main body 151 is in an operating position (protruded position), the first and the second electrodes 162a and 162b are short-circuitted to be in electrical contact with the brushes 161b and 161c.

In this specification, those portions comprising the strobo release lever 158, strobo lock lever 156, coil spring 154 and the like for protruding the strobo flash portion 105 from the stowed position to the operating position as described above is simply referred to as a strobo actuation member.

Figure 4:
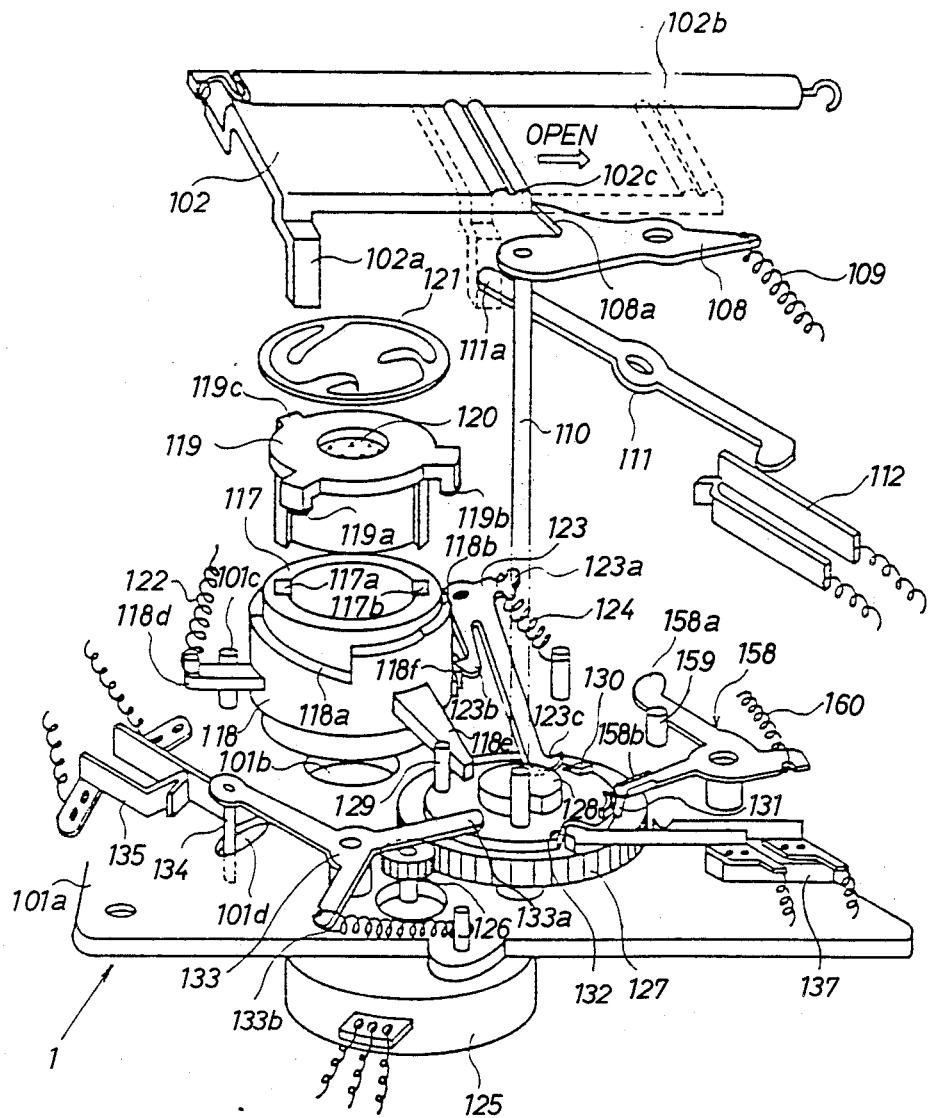
FIG. 4 is a perspective view for the structure of the second embodiment according to this invention.
Figure 5:
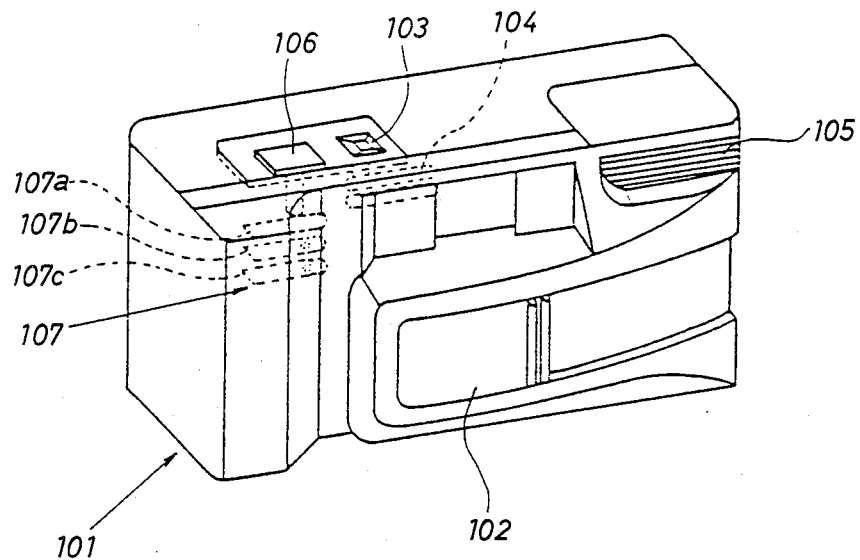
FIG. 5 is a perspective view illustrating the outer configuration of a camera of the second embodiment.

As shown specifically in the perspective view of FIG. 4, the barrier 102 is formed substantially in a rectangular configuration, in which an actuation piece 102a extended vertically below is disposed at the left lower corner thereof and, further, a tension spring 102b for resiliently energizing the barrier 102 in the opening direction, that is, rightwardly in FIG. 4, is attached to the piece extended from the upper left corner of the barrier 102.

Further, a lock piece 108a of a barrier lock lever 108 provided with a clockwise rotational resilient force by a tension spring 109 is engaged with the end face 102c at the right corner of the barrier 2, and a driving shaft 110 driven by a cam face 128 detailed later is planted at the top end of the barrier lock lever 108. Further, there is disposed a barrier open detection lever 111 having at one end thereof an engaging portion 111a urged to move by the actuation piece 102a when the barrier 102 is opened, and a barrier open detection switch 112 is disposed in a rotational area of the other end of the barrier open detection lever 111, so that when the barrier 102 is opened the switch 112 is pressed to be closed by the end of the barrier open detection lever 111.

On the other hand, as shown in FIG. 4, an opening 101b is perforated in a base plate 101a secured to the camera main body 101, and a fixed cylinder 117 is secured above the opening 101b. A focus ring 118 not movable in the direction of the optical axis but movable only in the rotating direction is engaged with the outer circumference of the fixed cylinder 117. Focus cams 118a, 118b and 118c symmetrically positioned with respect to each other are formed on the upper face of the focus ring 118.

Further, two guide grooves 117a and 117b are formed at the inner circumferential surface of the fixed cylinder 117 along the optical axis, and a lens frame 119 is engaged slidably in the direction of the optical axis along the guide grooves 117a and 117b as a guide. The lens frame 119 supports lens 120, and projections 119a, 119b and 119c abutting against the focus cams 118a, 118b and 118c respectively are provided at the flanged portion provided at the upper portion of the lens frame 119.

Further, a lens retainer spring 121 is disposed at the flange at the upper portion of the lens frame 119, and the spring 121 always presses the projections 119a, 119b and 119c against the focus cams 118a, 118b and 118c respectively to stabilize the state of contact between both of them.

A lug 118d protruding outwardly is disposed at a portion of the circumferential surface of the focus ring 118. The rotational position of the lug 118d is controlled by a stopper pin 101c and the focus ring 118 is provided with a rotational resilient force in the clockwise direction by a tension spring 122. A focus driving lug 118e extended outwardly is disposed at the circumferential surface of the focus ring 118 and a saw tooth-like engaging teeth 118f corresponding to the number of steps of the focus distance are also disposed thereon. The engaging teeth 118f engage with a lock finger 123b disposed at the top end of the second arm of a focus lock lever 123, which is provided with a rotational resilient force in the clockwise direction by a tension spring 124 attached at one end 123a of a first arm of the focus lock lever 123. Further, a turned up piece 123c bent upwardly at its top end is disposed at the top end of the third arm of the focus lock lever 123.

On the other hand, a pulse motor 125 is secured to the rear face of the base plate 101a. A power gear 126 secured to the power shaft of the motor 125 is protruded from the surface of the base plate 101a and the power gear 126 meshes with the toothed face formed on the circumferential surface of a rotational driving plate 127. A cam face 128, with which the driving shaft 110 is brought into sliding contact, is disposed at the central portion on the upper surface of the rotational driving plate 127.

A driving pin 129 is planted on the upper surface of the rotational driving plate 127 for driving the focus driving lug 118e when the driving plate 127 is rotated in the clockwise direction.

When the lock release protrusion 130 on the rotational driving plate 127 is rotated from the right side of the turned-up piece 123c in the counterclockwise direction, the turned-up piece 123c of the focus lock lever 123 is merely raised upwardly, whereas when the lock releasing protrusion 130 on the rotational driving plate 127 is rotated from the left side of the turned-up piece 123c in the clockwise direction, the turned-up piece 123c is forced by the side of the lock releasing protrusion 130 and the focus lock lever 123 is rotated in the counterclockwise direction against the resilient tension of the tension spring 124. As described above, the functional portion for displacing the lens from the initial position to the focus-adjusted position when driven by the driving portion on the rotational driving plate 127 (driving pin 129 in this embodiment) is referred to hereinafter as a lens actuation member. An optical image of the object through the lens is focused on the film when the lens is positioned at the focus-adjusted position.

Further, the rotational driving plate 127 is provided with an engaging protrusion 131 specifically described later and a step 132 for detecting the initial position of the rotational driving plate 127.

A sector lever 133 driven by the driving pin 129 is provided, and a driven portion 133a at the top end of the first arm of the sector lever 133 is adapted to be driven by the driving pin 129. Further, a tension spring 133b is attached at the top end of the second arm of the sector lever 133 and the sector lever 133 is provided with the rotational resilient force in the counterclockwise direction. A sector pin 134 extended downwardly in FIG. 4 is planted at the top end of the third arm of the sector lever 133. The sector pin 134 is adapted to be movable within a long guide hole 101d perforated through the base plate 101a. The sector pin 134 is engaged with a sector hole 101f of two shutter blades 101e (only one shutter blade is typically shown in FIG. 4) so that the opening 101b is opened when the driven portion 133a of the sector lever 133 is pushed by the driving pin 129 against the force of the tension spring 133b. Further, the top end of the third arm of the sector lever 133 pushes a trigger switch 135 composed of a leaf switch when the sector lever 133 rotates counterclockwise, to turn the switch off when the shutter blade is fully opened.

Figure 8:
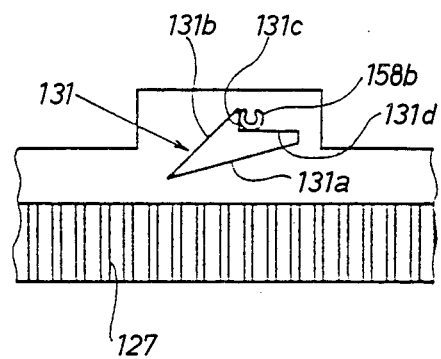
FIG. 8 is an enlarged side view of an engaging protrusion and a strobo-release lever in the second embodiment.

The engaging protrusion 131 disposed at the rotational driving plate 127, as shown in FIG. 8, is comprised of a lower sloped portion 131a slanting upwardly and an upper sloped portion 131b connected with the lower end of the lower sloped portion 131a, as well as, a vertical portion 131c and a horizontal portion 131d formed respectively by recessing the respective upper portions of the upper and lower sloped portions 131a and 131b.

Figure 9:
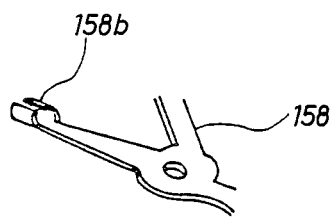
FIG. 9 is an enlarged perspective view illustrating one example of the strobo-release lever of the second embodiment.

The engaging portion 158b of the strobo release lever 158 is disposed above the engaging protrusion 131 in a state of being depressed downwardly by its own resiliency its own (refer to FIG. 9).

The step 132 is engaged with an actuation member of a position switch 137, which is adapted to be released when the rotational driving plate 127 is at an initial position to close (short circuiting) the position switch 137.

Figure 10:
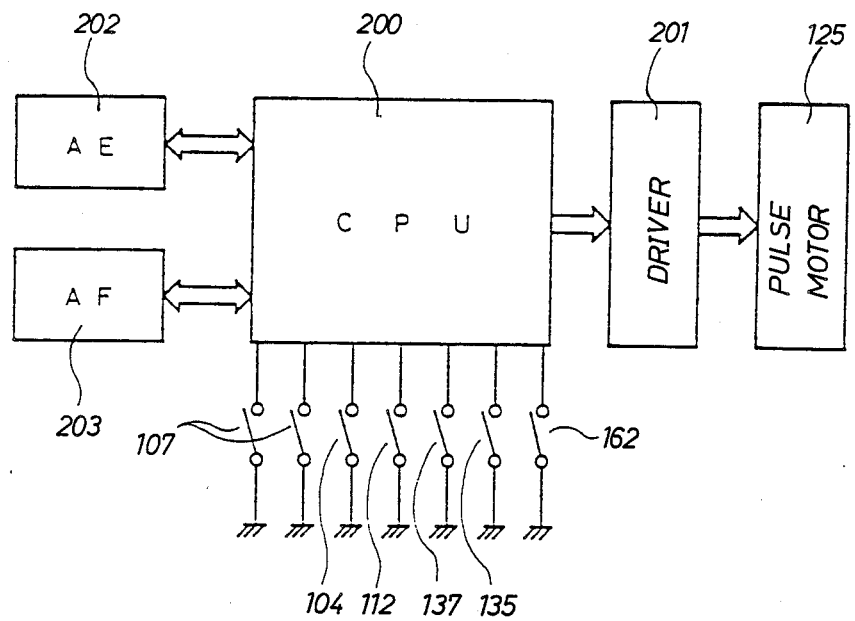
FIG. 10 is a circuit diagram illustrating an electrical circuit of the second embodiment according to this invention.

Each of the switches of the camera according to this invention thus constituted is connected to a CPU 200 as shown in FIG. 10, and the output of the CPU 200 is supplied by way of a driver 201 to the pulse motor 125 described above. Further, an AE control circuit 202 and an AF control circuit 203 are also connected to the CPU 200.

Then, explanation will be made to this embodiment having thus been constituted.

Figure 11:
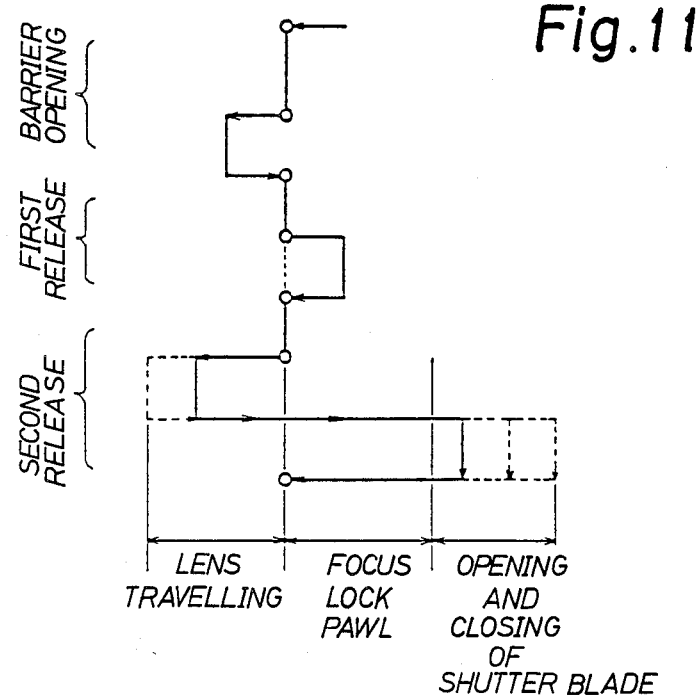
FIG. 11 is a diagram for illustrating the operation of the second embodiment.
Figure 12:
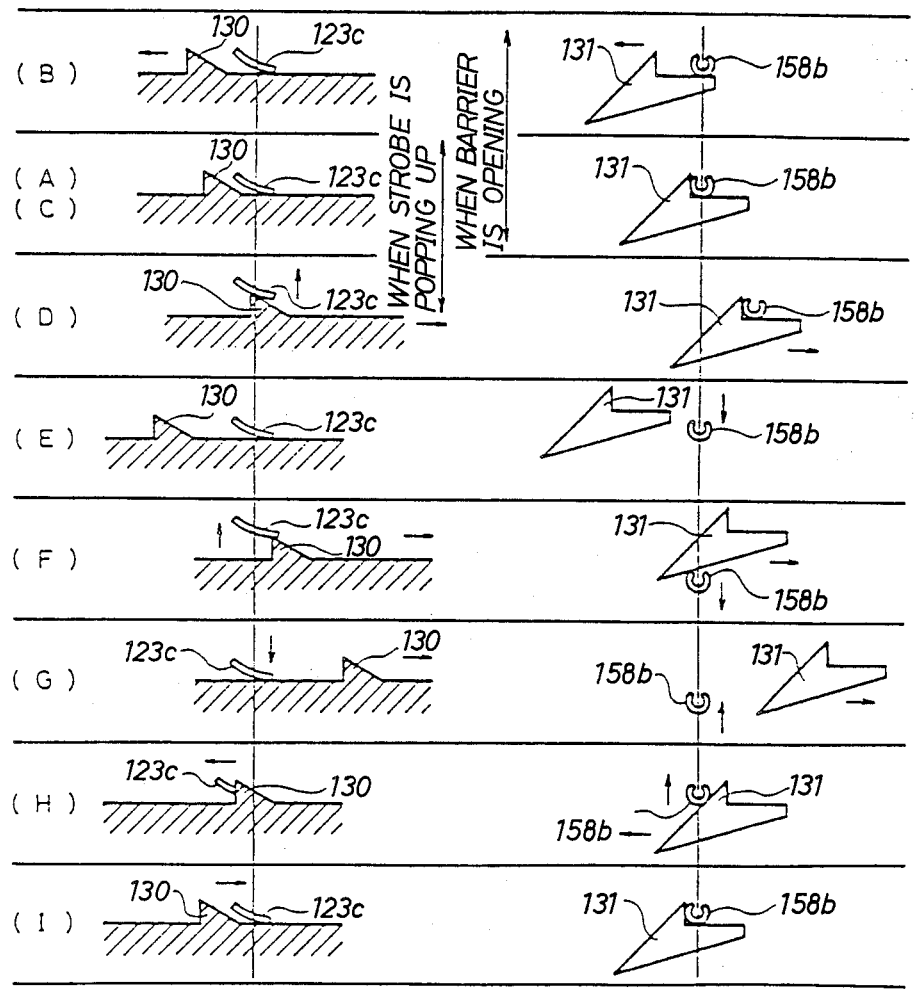
FIG. 12 is a diagram also for illustrating the operation of the second embodiment.

When the barrier open button 103 is depressed before photo-taking operation, the barrier open instruction switch 104 is turned ON, the ON signal is inputted to the CPU 200, the pulse motor 125 is rotated by way of the driver 201 by the pulse from the CPU 200, the rotational driving plate 127 rotates clockwise relative to the intial position as shown in FIG. 11, and the large diameter cam face of the barrier lock release cam 128 pushes the driving shaft 110. Then, the barrier lock lever 108 rotates counterclockwise against the resilient tension of the tension spring 109 to release the locking between the lock piece 108a and the end face 102c of the barrier 102. Therefore, the barrier 102 moves righwardly by the resilient tension of the tension spring 102b and the barrier open detection lever 111 is rotated clockwise by the piece 102a when the barrier 102 is fully opened to turn the barrier opening detection switch 112 to ON.

The relation between the lock release protrusion 130 and the turned-up portion of the focus lock lever 123 and the relation between the engaging protrusion 131 and the engaging portion 158b, when the rotational driving plate 127 causes the barrier 102 to open, are as shown in FIG. 12(B). When the barrier open detection switch 112 is turned ON, the ON signal is inputted to the CPU 200 shown in FIG. 10, by which the pulse motor 125 is driven backwardly by way of the driver 201 to turn the position switch 137 to OFF by the step 132 of the rotational driving plate 127. This OFF signal is inputted to the CPU 200, by which a stop signal from the CPU 200 by way of the driver 201 is applied to the pulse motor 125 and the pulse motor 125 is stopped to complete the opening operation of the barrier 102. The turned-up piece 123c of the focus lock lever 123 and the strobo-release lever 158 in this case are in the state as shown in FIG. 12(C).

The barrier can be closed by manual operation. When the release button 106 is depressed by one-half stroke in a state where the barrier 102 is fully opened, the contact 107a and the contact 107b are turned ON (short-circuitted) and the ON signal is inputted to the CPU 200. Then, a drive signal is outputted from the CPU 200 by way of the driver 201, the rotational driving plate 127 is rotated counterclockwise by the pulse motor 125. Accordingly the horizontal portion 131d of the engaging protrusion 131 shown in FIG. 8 is moved rightward keeping contact with the engaging portion 158b of the strobo-release lever 158. Further, when the rotational driving plate 127 continues to rotate counterclockwise, the engaging portion 158b is pushed by the vertical portion 131c of the engaging protrusion 131 (refer to FIG. 12(D)). Then, the strobo-release lever 158 rotates clockwise against the resilient tension of the tension spring 160, the abutting portion 156c is pushed by the engaging portion 158a against the resilient tension of the tension spring 157 and the strobo-lock lever 156 rotates counterclockwise, thereby releasing the lock of the recessed portion 151a with the lock piece 156a. Then, the strobo-main body 105 is erected vertically (protruded) through the clockwise rotation by the force of the coil spring 154 to be ready for the strobo-aided photographing. The charge control lever 161 is rotated clockwise by the force of the tension spring 163 following the erection of the strobo-main body 105, and the first electrode 162a and the second electrode 162b disposed on the base plate 162 are turned ON (short-circuitted) by means of brushes 161b and 161c. Then, strobo charging is started by the operation of the CPU 200.

Then, a current is supplied by way of the driver 201 to the pulse motor 125 to drive the pulse motor 125, by which the rotational driving plate 127 rotates clockwise, the driving piece 118e is pushed by the driving pin 129 against the resilient tension of the tension spring 122 and the focus ring 118 rotates counterclockwise. Then, the focus cams 118a, 118b, 118c advance the lens frame 119 (upwardly in FIG. 1) thereby conducting focus operation from the infinite ∞ to the nearest side.

In this case, current supply to the pulse motor 125 is interrupted when the AF control circuit 203 detects the completion of focusing to apply braking operation to the motor 125. In this case, since one of the engaging teeth 118f disposed at circumferential surface of the focus ring 118 is locked with the locking finger 123b energized by a tension spring 124, the focus-adjusted state is maintained.

Then, a current of the opposite polarity is supplied by the driver 201 to the pulse motor 125 based on the instruction of the CPU 200 and the rotational driving plate 127 is rotated backwardly (counterclockwise rotation) by the pulse motor 125 and returned to the initial position to set the engaging portion 158b of the strobo-release lever 158 below the lower sloped face 131a of the engaging protrusion 131 (refer to FIG. 12(F)).

On the other hand, if it is judged by the AE control circuit 202 that strobo-aided photographing is not necessary, pop-up driving is not conducted. That is, the strobo-main body 105 does not pop-up by the half-stroke depression of the shutter release button conducted after the barrier opening driving in this case, but the focus driving is conducted directly. During clockwise rotation of the rotational driving plate 127, that is, on the way of focus driving, since the engaging portion 158b of the strobo-release lever 158 is detached from the horizontal portion 131d of the engaging protrusion 131 and situated below the engaging portion 131 as shown in FIG. 12(E), the engaging portion 158b of the strobo-release lever 158 is brought into abutment against the lower sloped face 131a of the engaging protrusion 131 when the rotational driving plate 127 rotates counterclockwise and returns to the initial position after the completion of the focus driving (refer to FIG. 12(F)). Accordingly, even if the rotational driving plate 127 is subsequently rotated counterclockwise for opening operation of the shutter, since the engaging portion 158b is merely pushed in the direction of the optical axis by the engaging protrusion 131 and the strobo-release lever 158 is not rotated, the flash main body 151 also maintains the stowed position and charging of the strobo is not conducted.

This invention is no way restricted to the foregoing embodiment but may be embodied in various ways within the scope of the invention.

For instance, among the plurality of actuation members as described above, the barrier actuation member for displacing the barrier from the closed position to the open position is so adapted that the engagement of the barrier 102 resiliently held in the opening direction is released by the pulse motor 125 in this embodiment. Such an operation can also be made a manual operation.

Further, the relation between the rotational direction of the rotational driving plate 127 and the direction of driving for each of the actuation members is not restricted only to the embodiment described above. For instance, the barrier actuation member and the strobo-actuation member may be actuated by the driving in the same direction of the rotational driving plate 127. In this case, strobo actuation member may be actuated after the barrier actuation member has been actuated by the initial rotational amount of the rotational driving plate 127, followed by further rotation by a predetermined amount in the same direction. However, it is necessary that the strobo actuation member and the lens actuation member are actuated by the driving of the rotational driving plate 127 in the opposite direction by the reason described below. That is, although the circuit is structured such that the pulse motor 125 is not rotated so as to inhibit the driving for the strobo actuation member when it is judged by the AF control circuit 202 that strobo flash is not required, if it is constituted such that the lens actuation member is driven when the rotational driving plate 127 is rotated in the same direction as the driving direction of the strobo actuation member, the strobo actuation member is also driven in the identical process thereby setting the strobo-aided mode.

Further, the power source for rotating the rotational driving plate 127 is not always restricted only to the pulse motor 125, but a DC motor may be used for instance. However, the use of the pulse motor has an advantage that accurate and rapid control for the rotational angle can be attained easily.

The third embodiment of the lens driving and shutter opening and closing mechanism of the camera according to this invention will be described referring to FIGS. 13 through 18.

Figure 13:
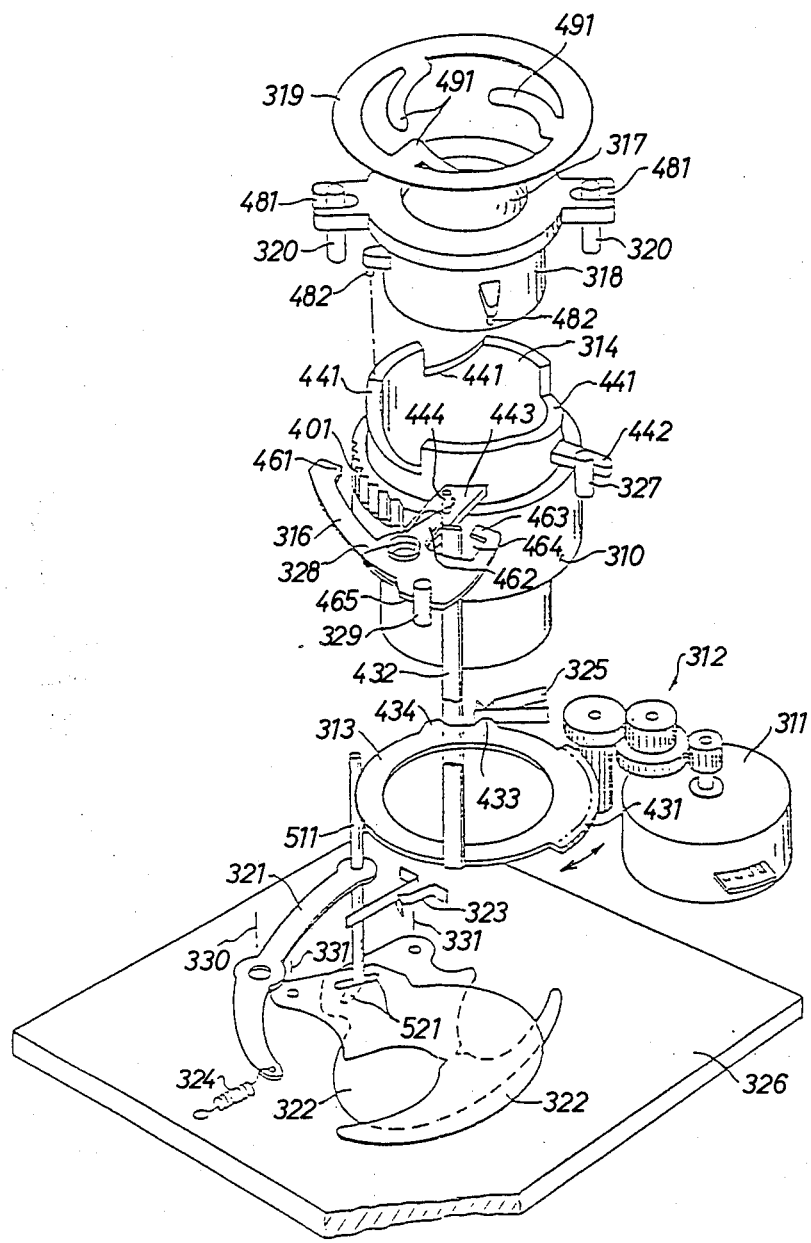
FIG. 13 is a perspective view illustrating a lens and shutter driving mechanism of a camera of the third embodiment according to this invention.

In FIG. 13, the rotational driving force of a pulse motor 311 is transmitted through a speed-reduction gear train 312 to a sector gear 431 of a ring-like driving member 313, so that the driving member 313 is rotationally driven in the forward and backward directions. A bent portion 432 extended upwardly is disposed at the outer circumferential edge of the driving member 313. Further, two cams 433 and 434 are disposed close to each other at the circumferential edge of the driving member 313. A portion of a position switch 325 is extended to the path of the cam 433 such that when the driving member 313 is at a reference position the position switch 325 is turned ON by being pushed by the cam 433 as shown in the drawing. An arm 443 of a distance cam 314 is closely situated at the side at the top end of the bent portion 432. The distance cam 314 is substantially of a cylindrical form and a protrusion 442 is disposed at the outer circumference thereof. When the distance cam 314 is at a reference position as shown in the drawing, the protrusion 442 abuts against a stopper 327 to restrict the rotation of the distance cam 314.

Three cam faces 441 of an identical configuration are formed on the upper surface of the distance cam 314. A lower half of a lens frame 318 is loosely inserted in the cylindrical distance cam 314, and three pins 482 disposed at the outer circumference of the lens frame 318 are abutted against the three cam faces 441 respectively. The lens frame 318 holds a lens 317. A pair of forked portions 481 are disposed at the outer circumference of the lens frame 318 and guide pins 320 are fitted into the forked portions 481 respectively so that the lens frame 318 is movable in the direction of the optical axes of the lens 317 being guided along the pins 320 but not rotatable around the optical axis. A ring-like retainer spring 319 is disposed above the lens frame 318 and three resilient arms 491 formed at the inner circumference of the spring of 319 push the lens frame 318, thereby pressing the pins 482 of the lens frame 318 against the cam faces 441 of the distance cam 314.

Figure 14:
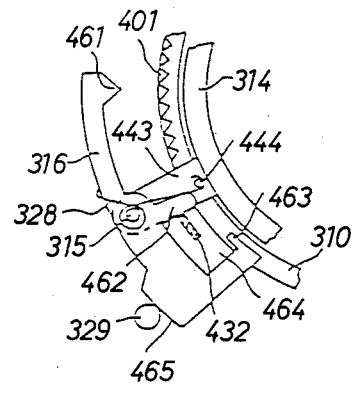
FIG. 14 is an enlarged plan view of a connection mechanism between the driving member and the lens driving member of the third embodiment.

As shown in FIG. 14, the distance cam 314 is fitted into a fixed ratchet cylinder 310 as a guide rotatably. A ratchet 401 is disposed at the outer circumferential surface of the ratchet cylinder 310. A hook lever 316 is dispoed rotatably on a horizontal plane at the arm 443 of the distance cam 314 by an axis 315. The hook lever 316 has a pawl 461 at one end thereof, a protrusion 462 disposed at the substantially central portion thereof along the arm 443 and, further, a hook portion 463 disposed at the other end thereof. The hook lever 316 is resiliently energized rotationally such that the pawl 461 is engaged with the ratchet 401 of the ratchet cylinder 310 by a spring 328 connected between the lever 316 and a pin 444 on the arm 443. At a reference position as shown in FIGS. 13 and 14, the hook lever 316 is rotated by the abutment of the stop pin 329 against the bulged portion 465 of the hook lever 316 against the resiliently force, the pawl 461 is greatly aparted from the ratchet 401 and the protrusion 462 of the lever 316 is substantially overlapped with the arm 443 of the distance cam 314. The upper end of the bent portion 432 of the driving member 313 is extended to a recess 464 formed with the hook 463 of the hook lever 316 and, at the reference position as shown in FIGS. 13 and 14, the bent portion 432 is in contact with an edge of the arm 443 of the distance cam 314.

In the following, the counterclockwise rotation purports the forward rotation and the clockwise rotation purports backward rotation of the driving member 313 in the drawing. The driving member 313 is rotated by the motor 311, at first forwardly from the reference position by an angle corresponding to the focus-adjusted distance, then rotated backwardly by a predetermined angle, thereafter, again rotated forwardly by a predetermined position and then rotated backwardly to the original position. An optical image of the object through the lens is focused on the film when the lens is displaced by the focus-adjusted distance. As can be seen from FIG. 14, when the driving member 313 is rotated forwardly from the reference position, since the hook 463 of the hook lever 316 situates on the path of the bent portion 432 of the driving member 313, the hook lever 316 couples the driving member 313 with the distance cam 314 and causes the distance cam 314 to rotate in the forward direction with the rotation of the driving member 313. Further, when the driving member 313 is rotated backwardly by a predetermined angle in the course of the forward rotation, since the bent portion 432 escapes from the hook 463 of the hook lever 316 and the bulged portion 465 of the hook lever 316 is apart from the stop pin 329, the hook lever 316 rotates in the direction as resiliently energized by the spring 328 and the hook 465 escapes from the path of the bent portion 432 in the counterclockwise direction.

A shutter base plate 326 is disposed below the driving member 313, a pair of shutter blades 322 are disposed at the shutter base plate 326 so as to be rotatable within a plane in parallel with the base plate 326 by an axis 331, and a sector lever 321 is disposed by an axis 330 rotatably within a plane in parallel with the base plate 326. The sector lever 321 is resiliently energized rotationally in the clockwise direction by a spring 324 and the rotation of the sector lever 321 by the resiliently energizing force is restricted when a pin 511 secured to the arm end of the sector lever 321 abuts against the outer circumferential surface of the driving member 313. The pin 511 of the lever 321 penetrates long holes 521 and 521 crossing each other on the paired shutter blades 322, 322 respectively. The pin 511 is pushed by the cam 434 of the driving member 313 and rotated counterclockwise against the resilient force when the driving member 313 is rotated forwardly from the reference position near the limit of position. By the counterclockwise rotation of the sector lever 321, the pin 511 causes a pair of shutter blades 322, 322 to rotate in the directions opposite each other thereby opening the optical path and, by the backward rotation of the driving member 313 from the vicinity of the limit of position toward the reference position, the sector lever 321 rotates clockwise and returns the shutter blades 322, 322 to close the optical path. A trigger switch 323 is disposed at the side of the pin 511 of the sector lever 321 such that the trigger switch 323 is pushed and turned ON by the pin 511 in the ordinary state where the shutter is closed, whereas the pin 511 escapes from the trigger switch 323 causing the switch 323 to be turned OFF when the shutter is opened.

The position switch 325 is used for detecting the abovementioned reference position.

Explanation will be made to the operation of the embodiment described above.

Figure 15:
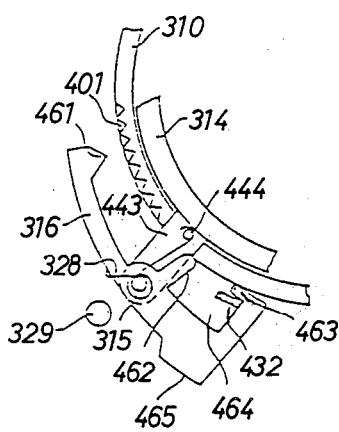
FIG. 15 is a plan view illustrating another operation mode of the connection mechanism.

When a shutter button not illustrated is depressed to turn the start switch ON, an automatic focusing device not illustrated measure the distance and a number of steps by which the pulse motor 311 is driven is stored according to the measured distance. The pulse motor 311 is driven according to the number of steps and the driving member 313 is rotated forwardly from the reference position by an amount corresponding to the measured distance that is, rotated counterclockwise in FIG. 13. By the rotation of the driving member 313, the bent portion 432 pushes the hook 463 of the hook lever 316. The hook lever 316 couples the driving member 313 with the distance cam 314 as a lens driving member and rotates the distance cam 314 forwardly accompanied by the forward rotation of the driving member 313. By the rotation of the distance cam 314, the bulged portion 465 of the hook lever 316 escapes from the stop pin 329 and the hook lever 316 rotates in the resiliently energizing direction. However, since the hook 463 of the hook lever 316 engages with the bent portion 432 of the driving member 313 as shown in FIG. 15, the rotation of the hook lever 316 in the resiliently energizing direction is inhibited before the pawl 461 engages the ratchet 401, and the distance cam 314 is rotated forwardly keeping the coupling of the driving member 313 with the distance cam 314. The amount of rotation in the forward direction is determined by the measured distance as described above. When the amount of rotation of the distance cam 314 is determined, the position of the cam face 441 against which the pin 482 of the lens frame 318 is abutted, is determined and the lens 317 is displaced in the direction of the optical axis by an amount corresponding to the measured distance and the focusing operation is completed.

In this way, when the driving member 313 is rotated forwardly by an amount corresponding to the measured distance, the pulse motor 311 rotates backwardly by a predetermined angle. By this backward rotation, the engagement of the bent portion 432 of the driving member 313 with the hook 463 of the hook lever 316 is released and the coupling between the driving member 313 and the distance cam 314 is also disengaged as described above. The hook lever rotates in the resiliently energizing direction and the pawl 461 engages with the ratchet 401 of the ratchet cylinder 310 to hinder the rotation of the distance cam 314, so that the lens 317 is not deviated from the focus-adjusted position.

When the coupling of driving member 313 and the distance cam 314 is released, the motor 311 is again driven forwardly to rotate the driving member 313 to be at a predetermined angular position. When the driving member 313 is rotated forwardly to a predetermined position, the cam 434 pushes the pin 511 and causes the sector lever 321 to rotate counterclockwise. The shutter blades 322 and 322 are rotated by the rotation of the lever 321 to start the shutter to open. As soon as the shutter is started to open, the trigger switch 323 is turned OFF to count a time and, if it reaches the time determined by a light measuring circuit not illustrated, the pulse motor 311 is again reversed and the driving member 313 is rotated backwardly toward the reference position. By the backward rotation of the ring 313, the sector lever 321 is rotated in the resiliently energizing direction, by which the shutter blades 322 and 322 are rotationally returned to close the shutter.

The driving member 313 is further rotated backwardly after the closure of the shutter and reaches a reference position. In the course where the driving member 313 reaches the reference position, the top end of the bending portion 432 approaches the arm 443 of the distance cam 314 and pushes the protrusion 462 of the hook lever 316 protruding from the side edge of the arm 443 outwardly by the rotation of the hook lever 316 in the resiliently energizing direction to rotate the hook lever 316 against the resilient force. By the rotation of the hook lever 316, the pawl 461 aparts from the ratchet 401 of the ratchet cylinder 310. Since the driving member 313 further rotates backwardly toward the reference position, the bent portion 432 pushes the arm 443 of the distance cam 314 thereby causing the distance cam 314 to return to the home position to reset the lens 317 and the stop pin 329 is abutted against the bulged portion 465 of the hook lever 316 to return the hook lever 316 to the home position as shown in FIG. 14. In this way, when the driving member 313 is returned to the reference position, the cam 433 thereof turns the position switch 325 ON and stops the pulse motor 311 to complete the operation of one sequence.

Figure 16:
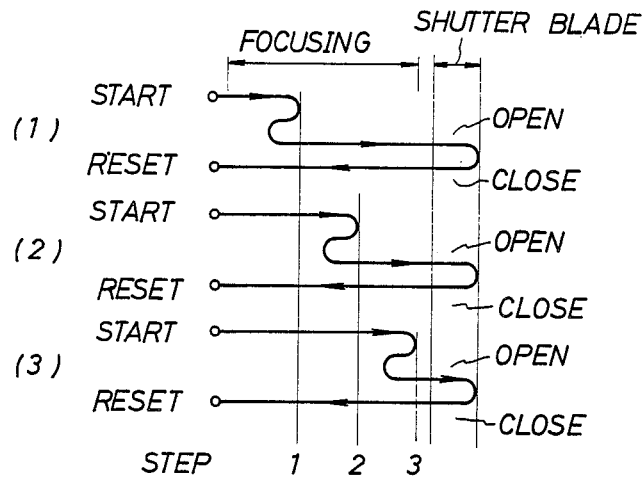
FIG. 16 is a diagram schematically illustrating the operation of the third embodiment.

FIG. 16 shows the foregoing operation concisely. As shown in FIG. 16, the step motor 311 drives the driving member 313 forwardly from the reference position by the number of steps in accordance with the measured distance at first. Here, the lens 317 is displaced in the direction of the optical axis to conduct the focusing operation. After that the pulse motor 311 causes the driving member 313 to rotate backwardly by a predetermined angle to disconnect the coupling between the driving member 313 and the distance cam 314 as the lens driving member and, thereafter, again causes the driving member 313 to rotate forwardly to a predetermined angular position to open the shutter. After the elapse of a predetermined time, the pulse motor 311 causes the driving member 313 to rotate backwardly to the reference position, thereby closing the shutter at the initial stage of the backward rotation, and resets the lens at the final stage of backward rotation to complete the operation sequence. The example of FIG. 16 comprises three steps of driving of lens as shown by (1), (2) and (3), but the number of the steps can be set optionally.

The lens driving and the shutter opening and closing mechanism described above can be controlled by a proper sequence control circuit.

Figure 17:
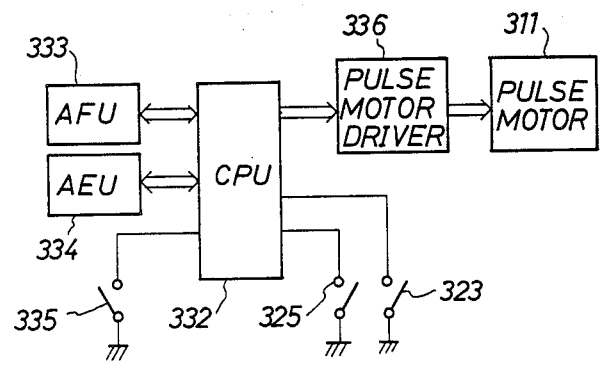
FIG. 17 is a block diagram illustrating an embodiment of a control circuit that can be applied to this invention.

FIG. 17 schematically shows an example of the control circuit. In FIG. 17, the sequence controlling CPU 332 is connected with the trigger switch 323 and the position switch 325, as well as, the start switch 335 operated interlocking with the release button. Further, the CPU 332 is so adapted that it controls the pulse motor 311 in the forward and backward rotational directions by way of a pulse motor driver 336 based on the distance information and exposure information from an automatic focusing unit 333 and an automatic exposure unit 334. Since the sequence control circuit has no direct concerns with this invention, detailed explanations therefor are omitted.

Then, another embodiment of the lens driving and shutter opening and closing mechanism of a camera according to this invention will be explained referring to FIG. 18. Since most of the constituent portions of this embodiment are substantially identical with those in the above-mentioned embodiment, explanations will be made mainly for different constitutional portions.

Figure 18:
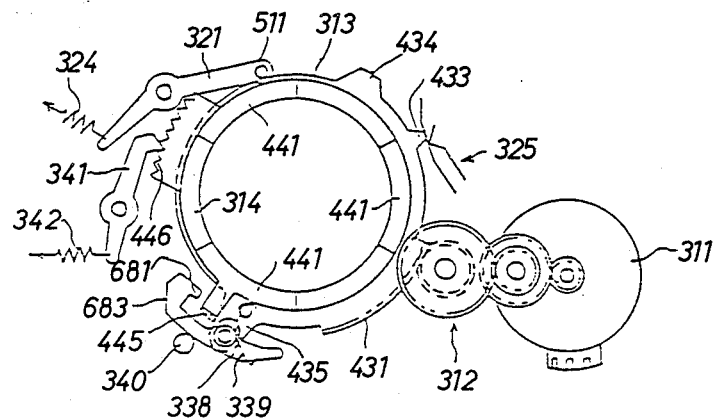
FIG. 18 is a plan view illustrating another embodiment of the lens driving and shutter mechanism of the camera as the third embodiment according to this invention.

In FIG. 18, a driving member 313 has an arm 435, a sector gear 431, and cams 433, 434. A hook lever 338 is pivotted with the arm 435 rotatably within a horizontal plane. The hook lever 338 has a bent hook 681 and a sloped face 683. Although the hook lever 338 is resiliently energized counterclockwise by the spring 339 in the drawing, the rotation by the resilient force is inhibited by the stop pin 340 at the reference position as shown in the drawing.

On the other hand, the distance cam 314 as the lens driving member has the same cam face 441 as that in the foregoing embodiment, a bent portion 445 and a ratchet 446 at the outer circumference.

At the reference position shown in the drawing, since the hook lever 338 is rotated clockwise against the resilient force, the driving member 313 is rotated forwardly (counterclockwise direction in the drawing), by which the hook 681 of the hook lever 338 engages the bent portion 445 of the distance 314 and causes the distance cam 314 to rotate forwardly keeping the engagement of the distance cam 314 with the driving member 313. The distance cam 314 is rotated forwardly according to the number of steps based on the distance information and the amount of the displacement of the lens in the direction of the optical axis is determined correspondingly. After the distance cam 314 has been rotated forwardly by the number of steps according to the measured distance, the driving member 313 is rotated backwardly by a predetermined angle by the motor 311. Since the hook lever 338 has already been aparted from the stop pin 340, the hook lever 338 escapes from the bent portion 445 of the distance cam 314 by the backward rotation of the driving member 313 and the hook lever 338 rotates in the resiliently energizing direction to disconnect the coupling between the driving member 313 and the distance cam 314.

Then, the motor 311 again rotates the driving member 313 forwardly to be at a predetermined angular position to open the shutter and, thereafter, rotates backwardly toward the reference position. The shutter is closed at the initial stage of the backward rotation of the driving member 313. The arm 435 of the driving member 313 pushes the bent portion 445 of the distance cam 314 to rotate the distance cam 314 to return to the reference position for resetting the lens at the latter stage of the backward rotation of the driving member. Further, the sloped face 683 of the hook lever 338 abuts against the stop pin 340 to rotate the hook lever 338 clockwise against the resilient force at the final stage of the backward rotation of the driving member 313, to return to the reference position shown in the drawing.

In FIG. 18, the ratchet pawl 341 is rotationally energized clockwise by a spring 342 and the pawl is always in engagement with a ratchet 446 of the distance cam 314. It is necessary to prevent the distance cam 314 from irregular movement, so that the position of the lens may not be deviated from the set position in the direction of the optical axis.

Explanation of other constitution and operation are omitted since they are similar to those of the embodiment in FIG. 13.

According to the embodiment in FIG. 18, constitution can be simplified by saving of the ratchet cylinder 310 etc in the embodiment shown in FIG. 13.

The fourth embodiment for the lens driving and shutter opening and closing mechanism by a pulse motor of a camera according to this invention will be explained referring to FIGS. 19 through 25.

Figure 19:
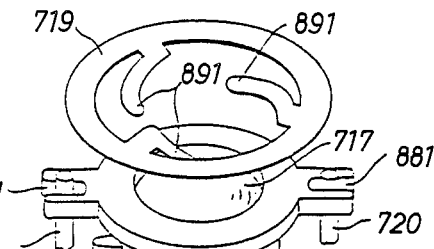
FIG. 19 is a perspective view illustrating the lens and shutter driving mechanism of the camera of the fourth embodiment according to this invention.
Figure 20:
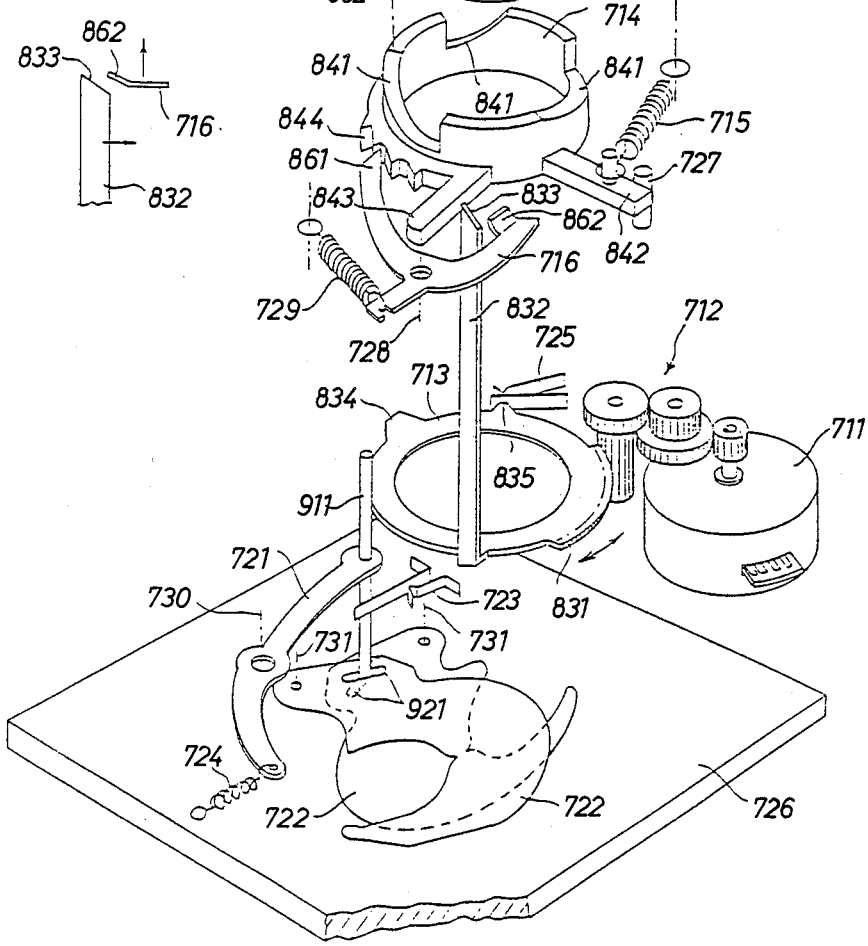
FIG. 20 is a side view illustrating a stop pawl and a ring of a blade of the fourth embodiment.

In FIG. 19, the rotational driving force of a pulse motor 711 is transmitted by way of a speed reduction mechanism 712 having a predetermined speed reduction ratio to a sector gear 831 of a shutter blade ring 713, so that the ring 713 is rotationally driven in the forward and backward rotations. A bent portion 832 is disposed at the outer circumferential edge of the blade ring 713, and the top end of the bent portion 832 is formed into a sloped face 833. A cam 834 and a protrusion 835 are also disposed at the outer circumferential edge of the blade ring 713. A portion of a position switch 725 is extended into the path of the protrusion 835 so that the position switch 725 is pushed by the protrusion 835 and turned ON when the blade ring 713 situates at a reference position as shown in the drawing. A protrusion 834 of a distance cam 714 is situated near the side of the top end of the bent portion 832. The distance cam 714 has a substantially cylindrical configuration and a ratchet 844 in continuous with the protrusion 843 and another protrusion 842 are disposed at the outer circumference thereof. A spring 715 is engaged with the protrusion 842 to rotationally bias the distance cam 714 in the counterclockwise direction, and the rotation of the distance cam 714 by the resilient force is regulated by a stopper 727.

Here, the clockwise rotation of the blade ring 713 purports the forward rotation and the counterclockwise rotation thereof purports the backward rotation in the drawing, when the ring 713 rotates forwardly from the reference position, it pushes the protrusion 843 of the distance cam 714 in the path of the top end of the bent portion 832 thereby causing the distance cam 714 to rotate clockwise against the resilient force of the spring 715. Three cam faces 841 of an identical configuration are formed at the upper surface of the distance cam 714. A lower half of a lens frame 718 is loosely inserted into the cylindrical distance cam 714, and three pins 882 disposed at the outer circumference of the lens frame 718 are abutted against the three cam faces 841 respectively. The lens frame 718 holds a lens 717. Further, a pair of forked portions 881 are disposed at the outer circumference of the lens frame 718 and these forked portions 881 are fitted with guide pins 720 so that the lens frame 718 is movable in the direction of the optical axis of the lens 717 by being guided along the pins 720 but not rotatable around the optical axis. A ring-like retainer spring 719 is disposed above the lens frame 718 and three resilient arms 891 disposed at the inner circumferential spring 719 push the lens frame 718 thereby pressing the pins 882 of the lens frame 718 to the cam faces 841 of the distance cam 14.

A stop pawl 716 is disposed rotatably within a horizontal plane by an axis 728 at the side of the protrusion 843 and the ratchet 844 of the distance cam 714. The stop pawl 716 has a bell crank-like configuration, the end of one arm of the stop pawl forms a pawl 861 facing the ratchet 844, while the end of the other arm forms an upwardly bent portion 862 at a position opposed to the sloped face 833 at the top end of the bent portion 832 of the blade ring 713. The stop pawl 716 is resiliently energized rotationally in the clockwise direction by a spring 729, so that the finger 861 is usually engaged with the ratchet 844 of the distance cam 714.

A shutter base plate 726 is disposed below the blade ring 713. A pair of shutter blades 722 are disposed at the shutter base plate rotatably within a plane in parallel with the surface of the base plate 726 by means of an axis 731, and a sector lever 721 is provided rotatably within a plane in parellel with the base plate 726 by means of an axis 730. The sector lever 721 is resiliently energized rotationally clockwise by a spring 724 and the rotation of the sector lever 721 by the resilient force is regulated by the abutment of a pin 911 secured to the arm end of the sector lever 721 against the outer circumferential surface of the blade ring 713. The pin 911 of the lever 721 penetrates long holes 921, 921 which are formed so as to cross the paired shutter blades 722, 722 respectively. The pin 911 is adapted to be rotated in the counterclockwise direction against the resilient force being pushed by the cam 834 of the blade ring 713 when the blade ring 713 is rotated backwardly by a predetermined amount from the reference position. When the sector lever 721 rotates counterclockwise, the pin 911 causes a pair of shutter blades 722, 722 to rotate in the directions opposed to each other to open the optical path, whereas the sector lever 721 rotates clockwise when the blade ring 713 rotates toward the reference position, to return the shutter blades 722, 722 to close the optical path. A trigger switch 723 is disposed at the side of the pin 911 of the sector lever 721 and the trigger switch 723 is turned ON being pushed by the pin 911 in a usual state where the shutter is closed, while the trigger switch 723 is turned OFF at the opening of the shutter since the pin 911 escapes from the trigger switch 723.

The blade ring 713 constitutes a driving member for driving the lens 717 in the direction of the optical axis, as well as for opening and closing the shutter and so adapted that it is forwardly driven from the reference position shown in the drawing by an amount corresponding to the measured distance, thereafter, returned to the reference position and then backwardly driven from the reference position by a predetermined amount. The position switch 725 is employed for detecting the reference position described above.

The discance cam 714 constitutes a distance setting member and it is adapted to be rotated against the resilient force according to the amount of forward rotation when the blade ring 713 is rotated forwardly from the reference position and to displace the lens 717 in the direction of the optical axis by an amount corresponding to the measured distance.

The operation of the mechanism as described above will be explained.

When a shutter button not illustrated is pushed and a start switch is turned ON, an automatic focus detection device not illustrated measures the distance and a number of steps to drive the pulse motor 711 is stored in accordance with the measured distance. The pulse motor 711 is driven corresponding to the number of steps, by which the blade ring 713 is rotated forwardly by an amount corresponding to the measured distance from the reference position, that is, in the clockwise direction in FIG. 19. By the rotation of the ring 713, the bent portion 832 thereof pushes the protrusion 843 of the distance cam 714 thereby causing the distance cam 714 to rotate clockwise against the resilient force. The amount of rotation of the distance cam 714 is determined by the amount of rotation of the ring 713. When the amount of rotation of the distance cam 714 is determined, the position of the cam face 841, against which the pin 882 of the lens frame 718 is abutted, is determined and the lens 717 is displaced by the amount corresponding to the measured distance in the direction of the optical axis to conduct focusing operation.

In this way, after the blade ring 713 is rotated forwardly by an amount corresponding to the measured distance, the pulse motor 711 is rotated backwardly to return the blade ring 713 to the reference position. In this case, although the top end of the bent portion 832 of the ring 713 abuts against the arm of one arm of the stop finger 716, since the top end of the bent portion 832 is formed into the sloped face 833, the sloped face 833 at the top end creeps under the bent portion 862 bent upwardly, and passes the position of the stop finger 716 distorting the stop finger 716 by resiliency, the stop finger 716 is not displaced rotationally thereby. Further, the rotation of the distance cam 714 in the resiliently energizing direction by the spring 715 is hindered by the engagement of the finger 861 of the stop finger 716 with the ratchet 844, so that the lens 717 is kept at a focused position.

The pulse motor 711 continues to drive the blade ring 713 to rotate backwardly by a predetermined amount from the reference position. When the ring 713 rotates backwardly, the cam 834 thereof pushes the pin 911 to rotate the sector lever 721 in the counterclockwise direction. By the rotation of the lever 721, the shutter blades 722, 722 are rotated thereby, to start opening of the shutter. As soon as the shutter is started to open, the trigger switch 723 is turned OFF to count a time, and when the counting reaches the time determined by a light measuring circuit not illustrated, the pulse motor 711 is again rotated backwardly to rotate the blade ring 713 toward the reference position. By the forward rotation of the ring 713, the sector lever 721 rotates in the energized direction thereby returning the shutter blades 722 and 722 to close the shutter.

The blade ring 713 is further rotated in the forward direction after the closure of the shutter and then reaches the reference position. In the course where the ring 713 reaches the reference position, the top end of the bent portion 832 pushes the end of one arm of the stop finger 716 thereby causing the stop finger 716 to rotate in the counterclockwise direction against the energizing force to release the engagement of the ratchet 844 with the finger 861. Thus, the distance cam 714 is rotationally returned in the energized direction and the cam faces 841 raises the lens frame 718 to reset the lens 717. In this way, when the blade ring 713 returns to the reference position, the protrusion 835 thereof turns the position switch 715 ON and, thereafter, stops the step motor 711 after rotation by several pulses thereby completing the operation of one sequence.

Figure 21:
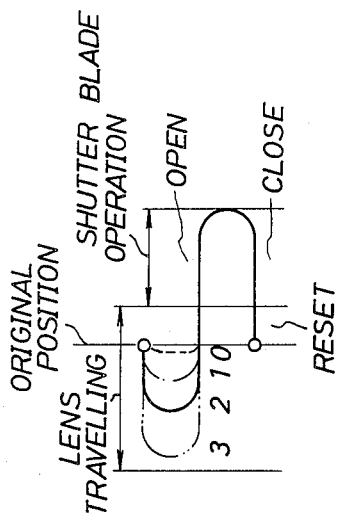
FIG. 21 is a diagram illustrating the outline of the operation of the fourth embodiment.
Figure 22:
FIG. 22 is a flow chart illustrating the sequence of the camera having the mechanisms according to the fourth embodiment.

FIGS. 21 and 22 show the foregoing operation in a simplified form, in which the FIG. 21 shows a relation between the lens operation and the shutter operation relative to the rotating direction of the step motor, while FIG. 22 shows the outline of the entire operation of the camera. As shown in FIG. 21, when the step motor is driven forwardly from the reference position, the lens is driven in the direction of the optical axis by the number of steps corresponding to the measured distance and then driven backwardly by a predetermined amount after being returned to the reference position to open the shutter. Then, when the motor is driven forwardly, the shutter is closed and, when the motor is further driven forwardly till the reference position, the lens position is reset. The number of steps of the lens driving may optionally be set.

The operation of the entire camera is as shown in FIG. 22, in which the distance is measured by an automatic focus detection device at first at shutter releasing operation, the lens is displaced in the direction of the optical axis in accordance with the measured distance, the shutter opening and closing operation is conducted for a period corresponding to the measured light value, the lens position is reset and, finally, a film is wound up to complete one sequence.

Figure 23:
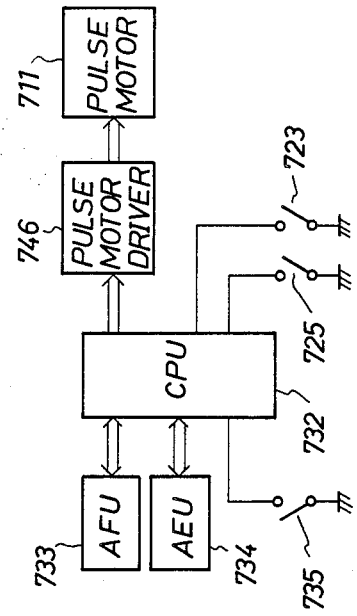
FIG. 23 is a block diagram illustrating an example of a control circuit that can be applied to this invention.

The lens driving and shutter opening and closing mechanism described above is controlled by a sequence control circuit. FIG. 23 schematically shows an example of the control circuit. In FIG. 23, the sequence control CPU 732 is connected with a trigger switch 723 and a position switch 725, as well as a start switch 735 operated interlocking with a release button. Further, the CPU 732 is adapted to control the pulse motor 711 in the forward and backward directions by way of a pulse motor driver 746 based on the measured distance information and exposure information from an automatic focus unit 733 and an automatic exposure unit 734. Since the sequence control circuit itself has no direct concerns with this invention, detailed explanations therefor are omitted.

Now comparing the load and the required driving speed at the lens driving operation with those at the shutter operation, the load at the lens driving operation is greater than that at the shutter operation, and it is required to increase the driving speed at shutter operation so as to be greater than that at lens driving operation. However, the lens driving and shutter opening and closing operations are conducted by a pulse motor 711 and the operations are carried out keeping the speed reduction ratio constant with the speed reduction mechanism 712. Then, a pulse motor having such characteristics that the torque is decreased as the rate of control pulse is increased, and the pulse signal is set to the pulse rate Pa at lens driving operation so as to obtain torque Ta balancing the maximum torque at lens driving operation, while setting the pulse rate at shutter operation to such a rate Pb as is capable of obtaining torque Tb balancing the load torque at shutter operation as shown by line A in FIG. 25.

Figure 24:
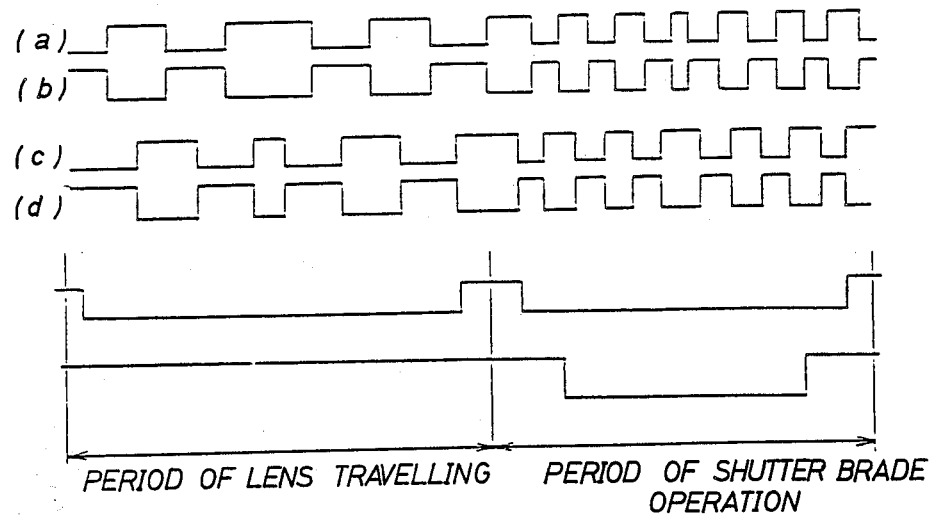
FIG. 24 is a timing chart illustrating the relation among each of the portions of the mechanism of the fourth embodiment according to this invention.
Figure 25:
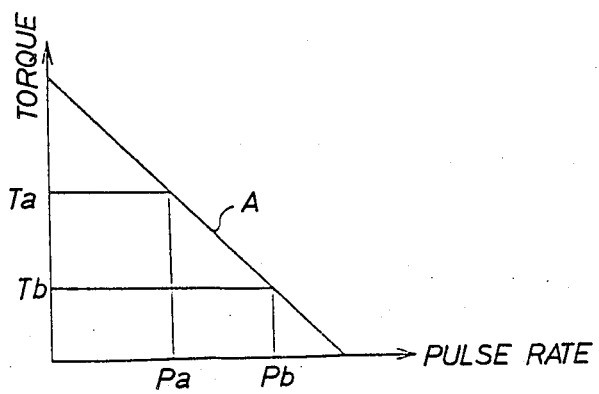
FIG. 25 is a diagram illustrating an example of a relation between the pulse rate and the torque of a pulse motor for the mechanism of the fourth embodiment according to this invention.

FIG. 24 illustrates a timing relation between the switching of pulse rate of pulse motor control and the position switch 725 and the trigger switch 723. As shown by a, b, c and d in FIG. 24, the pulse motor is of 2-phase excitation and the pulse rate of pulse motor in the shutter operation range is made higher than the pulse rate of pulse motor control in the lens driving range. Switching between the lens driving operation and the shutter operation, as well as stopping of the series of operations are conducted by the operation of the position switch 725. Further, the pulse rate of pulse motor control is switched in accordance with the position switch 725.

As has been described above, according to this embodiment, since the pulse rate of pulse motor control at lens driving operation is made lower than the pulse rate of pulse motor control at shutter operation, it is possible to obtain a large driving torque required at lens driving operation. Further, since the pulse rate of pulse motor control at shutter operation is increased to be high as compared with the pulse rate of pulse motor control at lens driving operation, it is possible to realize a high speed operation required for the shutter operation. As a result, with the use of only one pulse motor and the speed reduction mechanism with a constant reduction ratio, it is possible to reduce the size of the pulse motor and increase the operation speed as a whole.

The pulse rate of pulse motor control can be switched also by a switch for starting the counting of the shutter time, that is, by the operation signal from the trigger switch 723 in the embodiment shown in FIG. 19. Further, the pulse rate of pulse motor may also be switched in accordance with a program predetermined in the CPU 732 in the embodiment shown in FIG. 23. However, switching a signal from a switch operated interlocking with mechanical portions is more reliable since the control can be conducted corresponding to the actual operation of the mechanical portions. The pulse motor driving is not restricted only to that of the above-mentioned 2-phase excitation.

Obviously, numerous modications and variations of the present invention are possible in light of the above teachings. It is therefore to be understood that within the scope of the appended claims, the invention may be practiced otherwise than as specifically described herein.

What is claimed is:

1. An electric driving device for a camera in which various actuation members for photographing operation are driven by a motor, comprising:
a driving plate rotationally driven by a motor capable of forward and backward rotation and having driving means comprising a plurality of driving elements including an engaging protrusion and a pin at an outer surface thereof,
a strobo actuation member driven by said driving means when said driving plate is rotated by a predetermined amount from an initial position in a first direction for protruding a strobo member from a stowed position to an operating position,
a lens actuation member driven by said driving means when said driving plate is rotated by a predetermined amount from the initial position in a second direction opposite to said first direction for displacing a lens to a focus-adjusted position,
a shutter actuation member driven by said driving means when said driving plate is rotated from the initial position in said first direction followed by a rotation toward said initial position for opening and closing a shutter and
control means for controlling a rotational direction and amount of rotation of said motor in order that said driving plate is rotated in the first direction and in the second direction relative to the initial position.

2. An electric driving device for a camera in which various actuation members for photographing operation are driven by a motor, comprising:
a driving plate rotationally driven by a motor capable of forward and backward rotation and having driving means at an outer surface thereof,
a strobo actuation member driven by said driving means when said driving plate is rotated by a predetermined amount from an initial position in a first direction for protruding a strobo member from a stowed position to an operating position,
a lens actuation member driven by said driving means when said driving plate is rotated by a predetermined amount from the initial position in a second direction opposite to said first direction for displacing a lens to a focus-adjusted position,
a shutter actuation member driven by said driving means when said driving plate is rotated from the initial position in said first direction followed by a rotation toward said initial position for opening and closing a shutter, and
control means for controlling a rotational direction and amount of rotation of said motor in order that said driving plate is rotated in the first direction and in the second direction relative to the initial position.

3. The device of claim 2, in which said driving means comprises a plurality of engaging protrusions disposed at the outer surface of said driving plate which engage with the strobo actuation member, the lens actuation member, and the shutter actuation member to drive these members.

* * * * *